(12) United States Patent
Anstötz

(10) Patent No.: US 6,186,195 B1
(45) Date of Patent: Feb. 13, 2001

(54) SILO SYSTEM

(75) Inventor: Peter Anstötz, Lengerich (DE)

(73) Assignee: Windmoller & Holscher, Lengerich (DE)

( * ) Notice: Under 35 U.S.C. 154(b), the term of this patent shall be extended for 0 days.

(21) Appl. No.: 09/345,732

(22) Filed: Jul. 1, 1999

(30) Foreign Application Priority Data

Jul. 15, 1998 (DE) ............................................. 198 31 818

(51) Int. Cl.⁷ ..................................................... B65B 1/04
(52) U.S. Cl. ........................... 141/168; 141/98; 141/313; 141/114
(58) Field of Search ............................. 141/98, 168, 169, 141/170, 171, 166, 114, 313; 414/288, 298, 328

(56) References Cited

U.S. PATENT DOCUMENTS 3,968,626 * 7/1976 Hobbs ................................... 141/166

FOREIGN PATENT DOCUMENTS 1 349 252    4/1974 (GB) .

* cited by examiner

Primary Examiner—Steven O. Douglas
(74) Attorney, Agent, or Firm—Jacobson, Price, Holman & Stern, PLLC

(57) ABSTRACT

A system for the alternative charging of at least one sack filling machine and/or of at least one truck with pourable material, which is stored in a plurality of silos, which are firmly braced by columns, whereby each of the truck and the sack filling machine can be moved under desired silo outlets, and whereby, following the filling of the sacks, the sacks can be transported from the filling system over a totally or partially traversible intermediate conveyor to one of several conveyor belts. The intermediate conveyor, assigned to at least one filling machine, is designed as a traversible elevator at least over some regions. When in the working position, the discharge end of the conveyor corresponds with one of the conveyor belts, arranged above the required passage height necessary to move the sack filling machine or the truck.

14 Claims, 4 Drawing Sheets

SILO SYSTEM

BACKGROUND OF THE INVENTION

1. Field of the Invention

The invention relates to a system for the alternative charging of at least one sack filling machine and/or of at least one truck with pourable material.

2. Description of the Related Art

Such systems already exist in the prior art. The construction of a prior art system is described with reference to FIG. 3 and FIG. 4. FIG. 3 is a top view and FIG. 4 is a sectional side view of a corresponding system.

The system 10 exhibits a plurality of silos 14, which are firmly braced by columns 12, in order to receive pourable material. Below the silos 14 there are traversible sack filling machines 16, which can be moved under the outlets of specified silos, in order to receive the bulk material and then to fill sacks by the conventional method. The sacks 18, filled by the sack filling machines, are carried away by means of conveyor belts. To this end, there are two conveyor belts 20, 22, which run parallel over the entire length of the silos, which are arranged side by side.

Said belts run perpendicularly toward the conveyor belts 24, receiving the sacks 20. The conveyor belts 20 and 22 receive the sacks, filled by the sack filling machines, by means of intermediate conveyors 26, 28, which are arranged perpendicularly to the conveyor belts 20 and 22 and can be moved over the length of the conveyor belts 20 and 22, and conveyed to the conveyor belts 20 and 22. As can be inferred from FIG. 4, the conveyor belts 20, 22, 24, 26 and 28 are arranged on a level with the discharge station of the sack filling machine. Optionally trucks may also be filled by means of the silos. To this end, the trucks 32 have their own drive-through level 30, which is especially designed for trucks, below the level, at which the sack filling machines can be moved. The trucks 32 are filled by means of appropriate pipelines 34, which may or may not be secured by means of moveable frames 36, as illustrated in FIG. 4.

The prior art system has the drawback that it is three stories high and is, therefore, very large. The top floor level exhibits the fixed silos; on the center floor level the sack filling machines can be moved; and on the bottom floor level the trucks can drive in. Moreover, the sack filling machines on the center level cannot always be moved the shortest distance to the desired silo outlet, since the corresponding conveyor belts are in the way here.

SUMMARY OF THE INVENTION

Therefore, the object of the invention is to provide a system, with which at least one sack filling machine and/or at least one truck can be charged with pourable material, yet this system is comparatively smaller and the trucks or the sack filling machines can be moved quickly by the short route to the respective desired silo outlet.

The invention solves this problem, associated with this type of system, through the use of at least one intermediate conveyor for transporting sacks from a filling system to one of several conveyor belts. According to this solution, the at least one intermediate conveyor, assigned to the at least one filling machine, is designed as a traversible elevator at least over some regions. In the working position the discharge end of the intermediate conveyor corresponds with one of the conveying belts, arranged above the required passage height necessary to move at least one sack filling machine or at least one truck. On the basis of this solution, where the entire conveyor belt has been shifted upward beyond the traversing level for the sack filling machine, it is now possible to save one whole level. Owing to the solution of the invention, it is possible for the trucks to drive under the silo outlet on the same level, on which the sack filling machines can be moved. Furthermore, it is possible to move the sack filling machines to the silo outlets via the shortest route.

According to special embodiments, every filling machine can be assigned an elevator, which is connected thereto and can be moved together with it.

The elevator can be connected in such a manner to the filling machine that its height is adjustable. Optionally the respective filling machine and its elevator can be moved separately.

Other details and advantages follow from one embodiment, depicted in the drawings.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
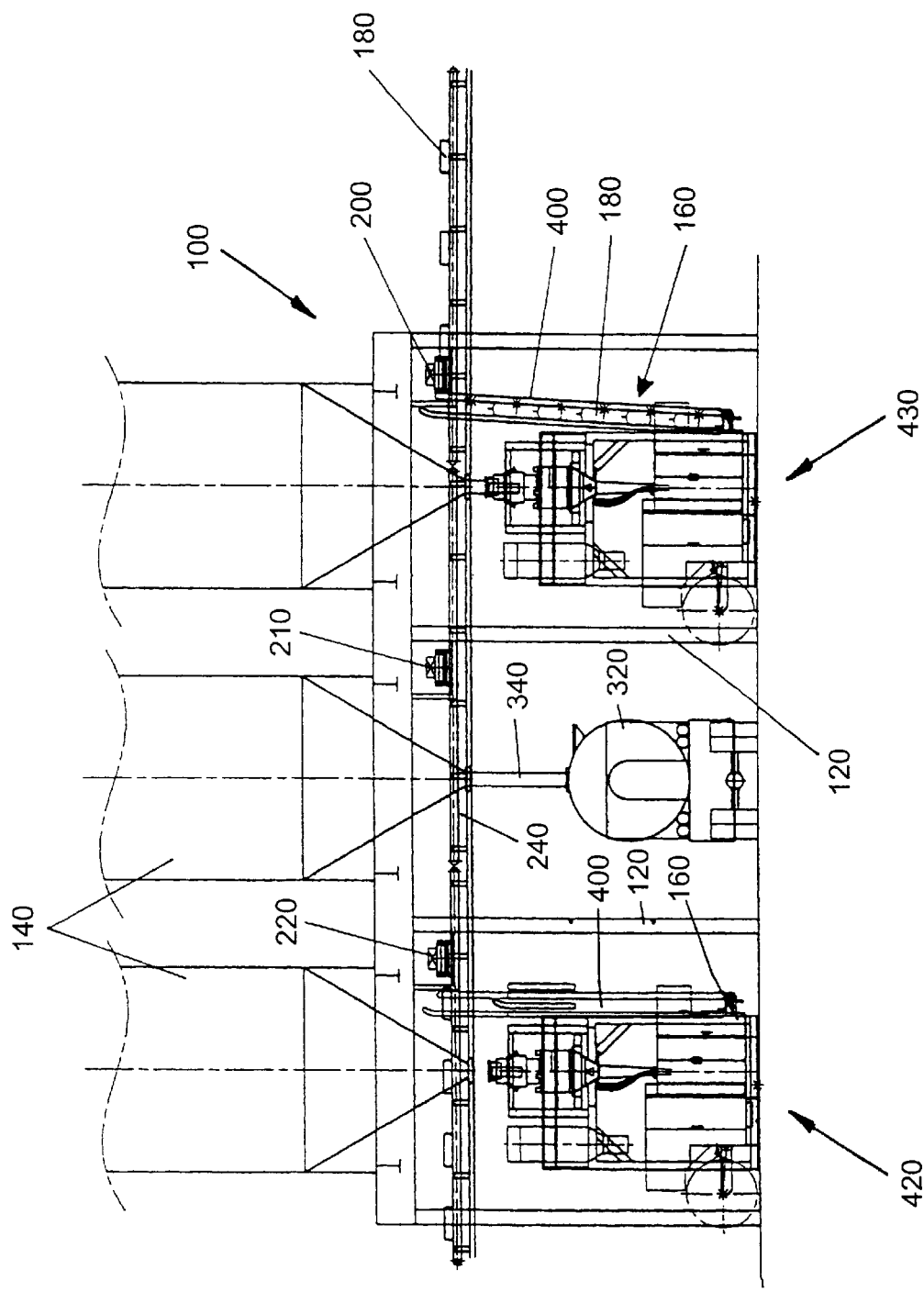
FIG. 1 is a side view of the system of the invention according to one embodiment.
Figure 2:
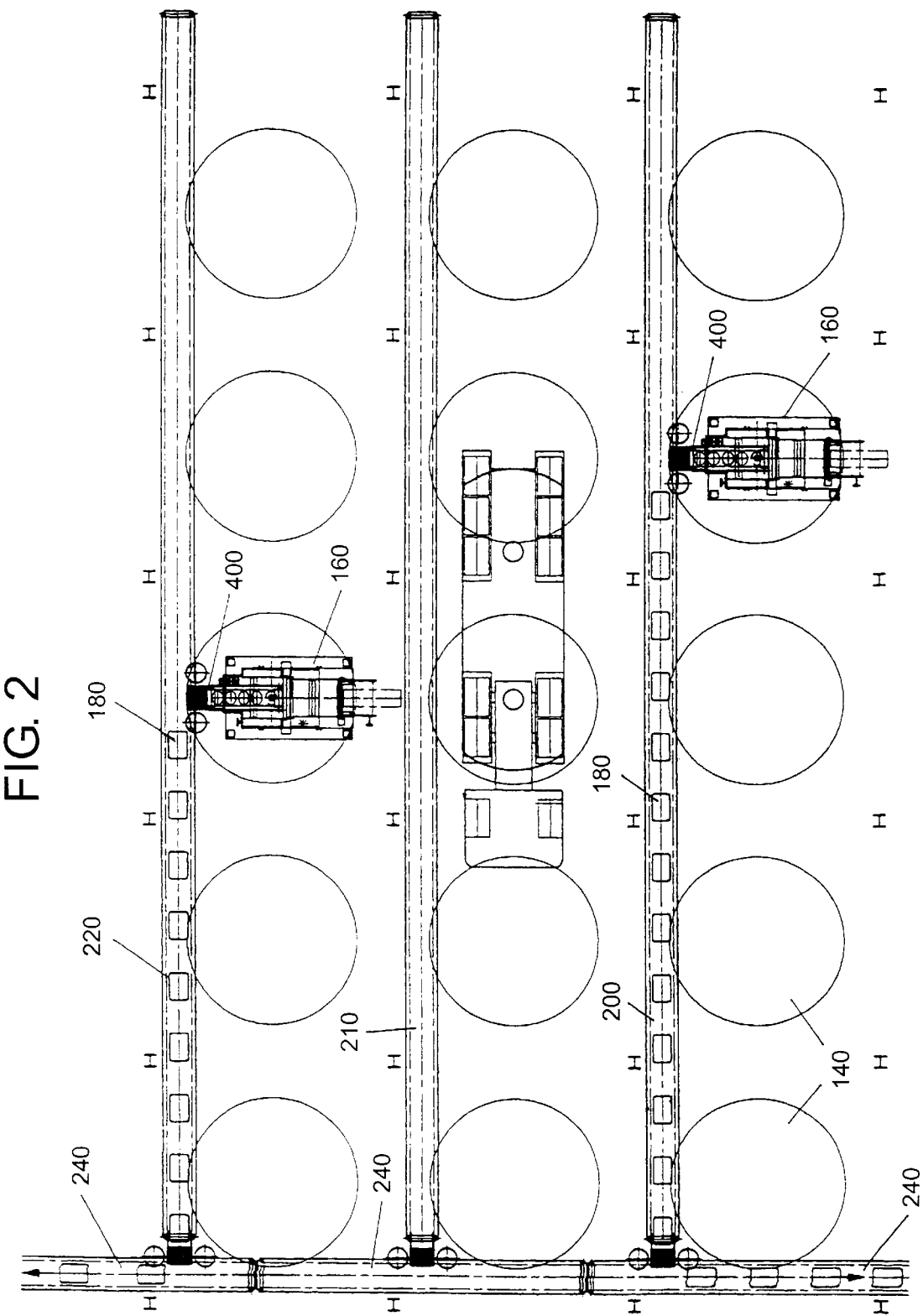
FIG. 2 is a top view of the system according to FIG. 1.
Figure 3:
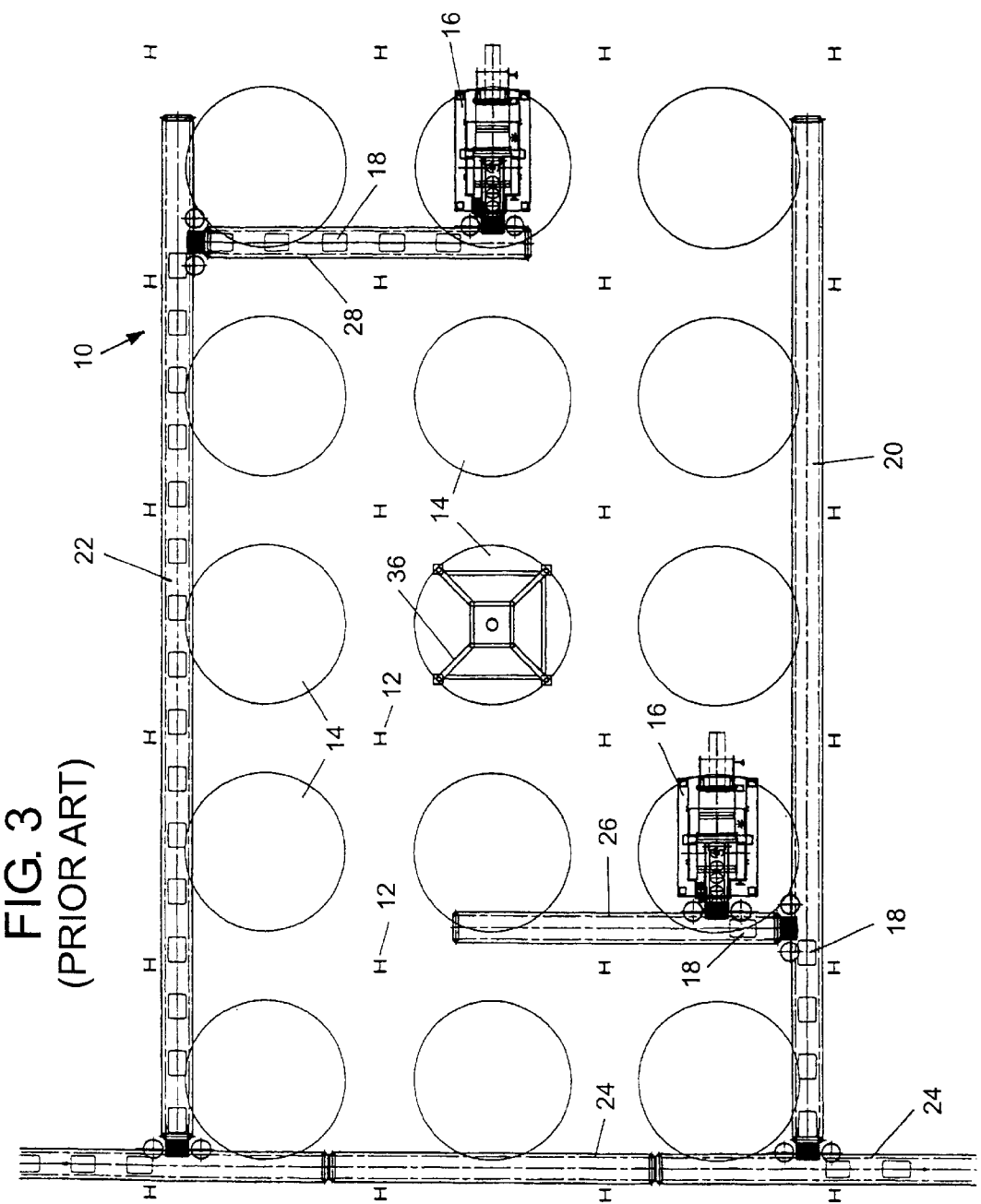
FIG. 3 is a top view of a system according to the prior art.
Figure 4:
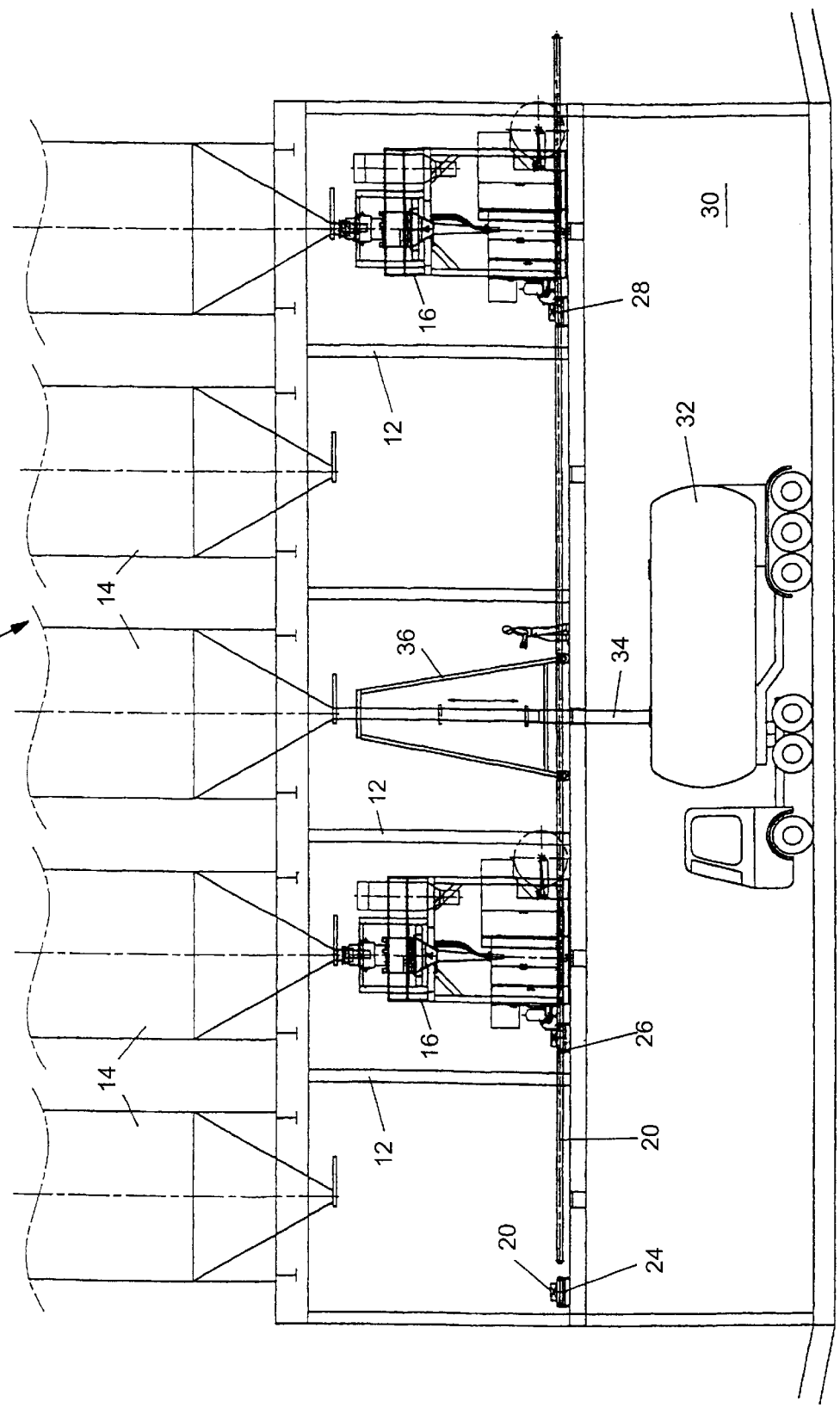
FIG. 4 is a side view of a system according to the prior art of FIG. 3.

FIGS. 1 and 2 show one embodiment of the invention presented here. The system 100 exhibits a plurality of silos 140, which are braced by columns 120. The columns 120 are so high that there is enough room below the fixed silos 140 to move the sack filling machines 160 or to drive the trucks 320 through.

As apparent from FIG. 2, the silos 140 are arranged in parallel rows, forming in the embodiment depicted here three parallel rows with five silos, standing equidistant apart. Parallel to the rows of silos are the conveyor belts 200, 210 and 220, which convey the sacks 180, filled in the sack filling machines, to the conveyor belts 240, which are arranged vertically to said former conveyor belts.

As evident from FIG. 1, the conveyor belts 200, 210, 220 and 240 are arranged above the necessary drive-through height, required to move the sack filling machines 160 or the trucks 320. The filled sacks, which are filled in the bottom region of the sack filling machines 160 and leave the sack filling machine closed, are conveyed from the sack filling machines to the conveyor belts 200, 210, or 220 by way of elevators 400, connected directly to the sack filling machine in the present embodiment. A truck 320 can also drive with ease between the sack filling machines 160 in order to be filled under the silo outlet of one of the preselected silos 140 and be connected to the appropriate silo outlet with a filling pipeline 340, as shown in FIG. 1.

The right side of FIG. 1, generally designated by the reference numeral 430, shows in production in production a sack filling machine 160, which is connected to a silo outlet and fills the sacks 180 and conveys them to the conveyor belt 120 by means of the elevator. The left side of FIG. 1, generally designated by the reference numeral 420, shows a filling machine 160, which is already separated from the silo and which is in a position ready to be moved. The filling machines can be moved in the conventional manner. According to the embodiment of the invention, the conveyor belts are no longer in the way of the moving sack filling machine so that the sack filling machine 160 can be assigned by the shortest route to the respective fill opening of the desired silo.

In an alternative design that is not shown here, the elevators can also be arranged separately from the filling machines 160 and connected to them only as desired.

The invention being thus described, it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. System for the alternative charging of at least one sack filling machine and/or of at least one truck with pourable material, which is stored in a plurality of silos, which are firmly braced by columns, whereby both the at least one truck and/or the at least one sack filling machine can be moved under desired silo outlets, and sacks filled by the sack filling machine can be transported from the filling machine to one of several conveyor belts wherein said conveyor belts are arranged above a required passage height necessary to move at least one sack filling machine or at least one truck under the conveyor belts, and further including at least one intermediate conveyor, assigned to at least one filling machine and designed as a traversible elevator at least over some regions, having a discharge end corresponding with one of said conveyor belts when said elevator is in position for use to transfer filled sacks to one of said conveyor belts.

2. The system as claimed in claim 1, wherein each filling machine is assigned an elevator, which is connected thereto and which can be moved together with it.

3. The system as claimed in claim 1, wherein a height of the elevator is adjustable.

4. The system as claimed in claim 1, wherein the at least one filling machine and the elevator can be moved separately.

5. A system for the charging of a sack filling machine and/or a truck with material which is stored in a plurality of silos mounted on a structure to allow said truck and/or said sack filling machine to be moved under desired silo outlets, said system comprising a conveyor belt, arranged above a required passage height necessary to accommodate a sack filling machine or a truck beneath the conveyor belt, and a traversible elevator for transporting sacks filled by a sack filling machine to said conveyor belt, a discharge end of said traversible elevator corresponding with a height of said conveyor belt when said elevator is positioned for use in sack transport.

6. The system as set forth in claim 5, including a plurality of sack filling machines, wherein each sack filling machine is assigned a traversible elevator which is connected thereto and movable together with the respective sack filling machine.

7. The system as set forth in claim 5, wherein said traversible elevator is movable separate from any sack filling machine.

8. A system for the charging of at least one sack filling machine and/or of at least one truck with pourable material which is stored in a plurality of silos arranged in rows, comprising a structure for supporting said plurality of silos while providing sufficient room to allow a truck or a sack filling machine to be moved under desired silo outlets at a same level, at least one substantially horizontal conveyor belt supported by said structure, and an intermediate conveyor for transporting sacks filled by a sack filling machine to said conveyor belt.

9. The system as set forth in claim 8, wherein said intermediate conveyor, when positioned for use with a sack filling machine, has a discharge end corresponding with a height of said conveyor belt.

10. The system as set forth in claim 9, wherein said conveyor belt is arranged above a required passage height necessary to accommodate a sack filling machine or a truck beneath the conveyor belt.

11. The system as set forth in claim 8, wherein said intermediate conveyor is an elevator.

12. The system as set forth in claim 11, including a plurality of sack filling machines, wherein each sack filling machine is assigned an elevator which is connected thereto and movable together therewith.

13. The system as set forth in claim 11, wherein said elevator is movable separate from any sack filling machine.

14. The system as set forth in claim 13, wherein said elevator, when positioned for use with a sack filling machine, has a discharge end corresponding with a height of said conveyor belt.

* * * * *